United States Patent [19]

Shimode et al.

[11] Patent Number: 4,559,255
[45] Date of Patent: Dec. 17, 1985

[54] ACOUSTICAL ABSORBING MATERIAL

[75] Inventors: Shinichi Shimode; Shigenori Sato, both of Ibaraki, Japan

[73] Assignee: Hitachi, Ltd., Tokyo, Japan

[21] Appl. No.: 685,113

[22] Filed: Dec. 21, 1984

[30] Foreign Application Priority Data

Dec. 26, 1983 [JP] Japan .................. 58-243950

[51] Int. Cl.$^4$ ........................... B32B 3/10; B32B 5/32
[52] U.S. Cl. .................................. 428/138; 181/290; 181/293
[58] Field of Search ................. 181/290, 293, DIG. 1; 428/138, 316.6, 137

[56] References Cited

U.S. PATENT DOCUMENTS 3,126,978 3/1964 Bergstrom ........................ 181/290
3,870,591 3/1975 Witman ........................... 428/316.6

FOREIGN PATENT DOCUMENTS 1625422 7/1970 Fed. Rep. of Germany ... 428/316.6
1362035 4/1964 France ........................... 428/316.6

Primary Examiner—William J. Van Balen
Attorney, Agent, or Firm—Antonelli, Terry & Wands

[57] ABSTRACT

An acoustical absorbing material including a plurality of porous sheets and a plurality of high density sheets alternately superposed one over another and held together with contact with one another. At least one of the high density sheets is formed therein with one or more through-holes. The acoustical absorbing material of the above-mentioned construction exhibits a good acoustical absorption performance in a wide frequency range even if its thickness is not varied, and is effective in shutting off noises produced by electronic equipment, such as a computer.

7 Claims, 5 Drawing Figures

ACOUSTICAL ABSORBING MATERIAL

BACKGROUND OF THE INVENTION (1) Field of the Invention

This invention relates to acoustical absorbing materials, and more particularly to acoustical absorbing material suitable for use with electronic equipment, such as, for example, a computer, which is required to show a good acoustical absorbing performance in a wide frequency range.

(2) Description of the Prior Art

Acoustical absorbing materials of the prior art usually consist of one layer of a porous sheet made of, for example, foamed plastics. The acoustical absorbing material of the type which consists of this single porous layer exhibits an acoustical absorbing characteristics which has a lower absorbing performance in a low frequency range but an absorbing performance increasing as the frequency increases. Therefore, if an increased acoustical absorbing effect should be desirable in the low frequency range, it has hitherto taken a measure to increase the thickness of the porous sheet.

However, the thickness of the acoustical absorbing material is limited in many case from the view point of using, therefore it is impossible to increase its thickness unlimitedly. Moreover, an increase in the thickness of the acoustical absorbing material incurs a rise in its cost, causing an increase in the production cost of electronic equipment and electrical household appliances.

In order to improve the acoustical absorbing performance in the low frequency range, there has been also provided such an acoustical absorbing material that porous sheets made of, for example, foamed plastics and high density sheets made of, for example, vinyl resins, are alternately superposed one over another. This type of acoustical absorbing material exhibits an acoustical absorbing performance superior in the low frequency range, but inferior in the high frequency range. To enhance the acoustical absorbing effect in the high frequency range, the thickness of the porous sheets may be increased. However, this would result in disadvantage similar to the acoustical absorbing material of the single porous sheet type, thereby such multilayer acoustical absorbing materials do not have a large flexibility in use.

SUMMARY OF THE INVENTION

Object of the Invention

One object of the invention is to provide an acoustical absorbing material which exhibits a good acoustical absorbing performance in a wide frequency range without increasing its required thickness.

Statement of the Invention

In order to accomplish the above-mentioned object, according to the invention, there is provided an acoustical absorbing material composed of porous sheets and high density sheets which are alternately superposed one over another in intimate contact with each other, wherein at least one high density sheet is formed therein with at least one through-hole.

DESCRIPTION OF THE PREFERED EMBODIMENTS

Figure 1:
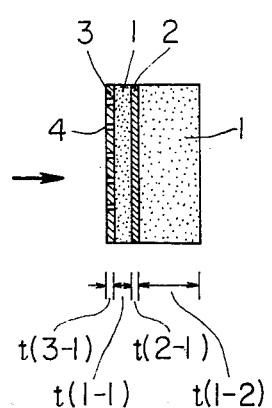
FIG. 1 is a fragmentary sectional view of the acoustical absorbing material in one embodiment form of the invention.

A preferred embodiment of the invention will now be described with reference to the accompanying drawings. FIG. 1 shows, in a sectional view, one preferred embodiment of the acoustical absorbing material of the invention, and FIG. 2 shows, in a fragmentarily sectioned perspective view of the acoustical absorbing material according to the invention shown in FIG. 1.

Figure 2:
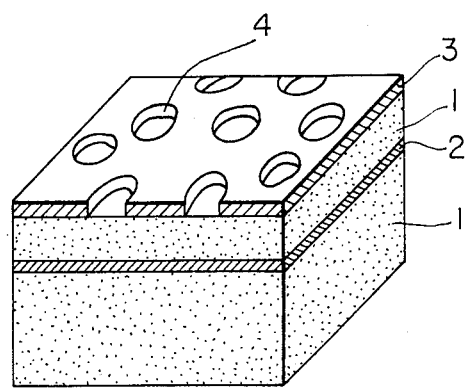
FIG. 2 is a fragmentarily sectioned perspective view of the acoustical absorbing material shown in FIG. 1.

Referring to FIGS. 1 and 2, the acoustical absorbing material in one embodiment form according to the invention comprises porous sheets 1 formed of a material having an acoustical absorbing characteristics, such as, for example, foamed plastics, and high density sheets 2 and 3 made of vinyl resin, the high density sheet 3 being formed therein with one or more through holes 4. When the overall thickness of the acoustical absorbing material should be limited, the porous sheets 1 and the high density sheets 2 and 3 can be alternately superposed one over another in a suitable numbers not more than the limited overall thickness of the acoustical absorbing material. With this arrangement the direction in which sound is propagated through the acoustical absorbing material, according to the invention, having an overall thickness of 20 mm is indicated by an arrow. The applicants have conducted experiments to compare the acoustical absorbing material shown in FIGS. 1 and 2 with acoustic absorbing materials of the prior art with respect to the frequency characteristics of the normal incident absorption coefficient. The results of the experiments are discussed herebelow. It is noted that even if the direction in which sound is incident on the acoustical absorbing material differs from that shown in FIG. 1, the same effect may be obtained in the acoustical absorbing material according to the invention.

In the embodiment of the invention shown in FIGS. 1 and 2, one of the two porous sheets 1 has a thickness t (1-1) of 4 mm and the other porous sheet 1 has a thickness t (1-2) of 14 mm. The high density sheet 2 has a thickness t (2-1) of 1 mm, and the high density sheet 3 has a thickness t (3-1) of 1 mm and is formed with a plurality of through-holes 4. The porous sheets 1, high density sheet 2 and high density sheet 3 are superposed one over another and closely contacted together as shown in FIG. 2. The characteristic of the acoustical absorbing material of the construction shown in FIG. 2 was compared with that of acoustical absorbing materials of the prior art composed of porous sheets and high density sheets with no through-holes which are superposed one over another. All the materials had the uniform thickness of 20 mm. The results are shown in FIG. 3.

Figure 3:
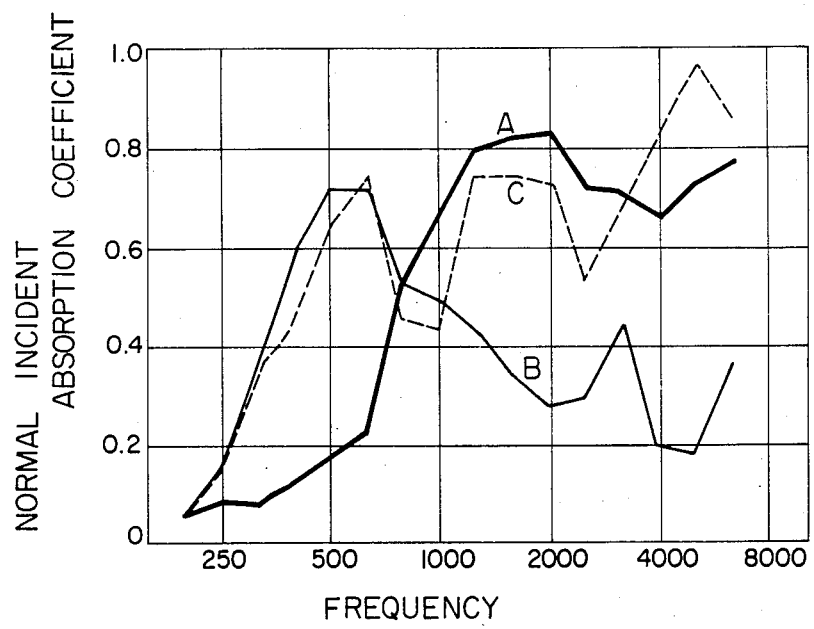
FIG. 3 is a diagrammatic representation of a comparison of the acoustical absorbing material according to the invention with respect to acoustical absorbing materials of the prior art.
Figure 4:
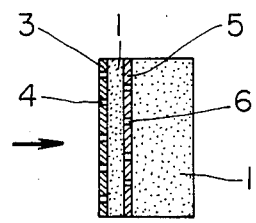
FIG. 4 is a fragmentary sectional view of the acoustical absorbing material in another embodiment form of the invention.

In FIG. 3, a curve A (thick solid line) represents the characteristics of an acoustical absorbing material of the prior art having a single layer of porous sheet, a curve B (fine solid line) represents an acoustical absorbing material of the prior art composed of porous sheets and high density sheets with no through-holes, and a curve C represents the characteristics of the acoustical absorbing material according to the invention shown in FIG. 1 in which the through-holes 4 in the high density sheet 3 have a total area which is about 1/20 of the area of the high density sheet 3. In FIG. 3 it will be seen that the acoustical absorbing material according to the invention has a high normal incident absorption coefficient in a wide frequency range including a low frequency range and a high frequency range, in contrast to the conventional one, even if it has the same thickness as the acoustical absorbing materials of the prior art. Due to the provision of one and more through-holes 4 in the high density sheet 3, the results achieved by the acoustical absorbing material shown in FIG. 1 is believed to show that the improved effect achieved in the low frequency range by the combination of the high density sheet 3 and the porous sheet 1 and the excellent effect achieved in the high frequency range by the porous sheet 1 itself can be effectively combined. The acoustical absorbing material according to the invention can exhibits the desired effects as far as the total area of the through holes 4 is less than 20% of the area of the high density sheet 3. However, it has been proved that the area of the holes 4 more than 20% in proportion, lowers the performance of the acoustical absorbing material according to the invention in the low frequency range. FIG. 4 shows another embodiment of the invention in which the acoustical absorbing material comprises porous sheets 1, a high density sheet 3 formed therein with one or more through-holes 4 and a high density sheet 5 formed with one or more through-hole 6. The embodiment shown in FIG. 4 is similar in construction to the embodiment shown in FIG. 1, excepting that the high density sheet 5 is formed therein with at least one through-hole 6 as in the high density sheet 3.

Figure 5:
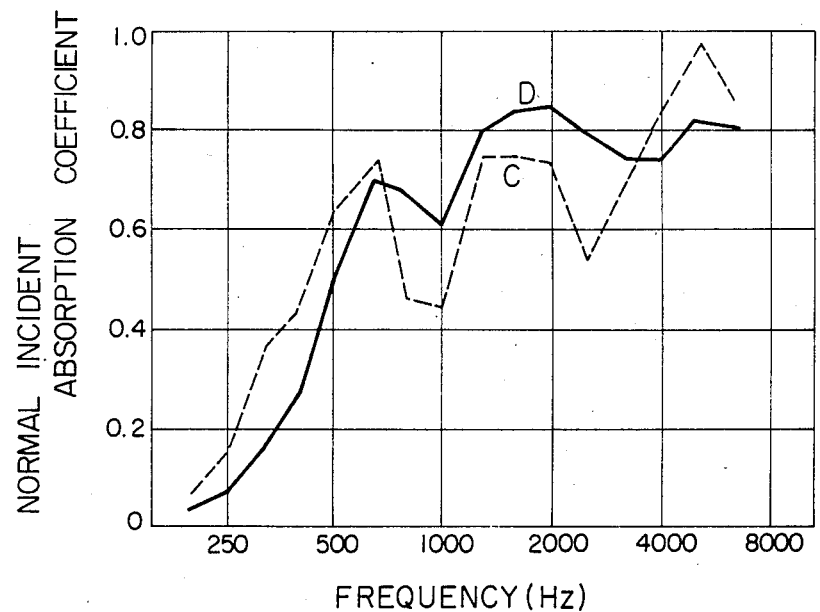
FIG. 5 is a diagrammatic representation of a comparison of the embodiment shown in FIG. 1 with the embodiment shown in FIG. 4.

FIG. 5 shows a comparison of the embodiment shown in FIG. 1 with the embodiment shown in FIG. 4 with respect to the acoustical absorbing performance. The total area of the through-holes is about 5% of the area of the high density sheet. In the graph shown in FIG. 5, a curve (broken line) C represents the characteristic of the embodiment shown in FIG. 1 and a curve (solid line) D represents that of the embodiment shown in FIG. 4. The acoustical absorbing material had an overall thickness of 20 mm both in the embodiment shown in FIG. 1 and in the embodiment shown in FIG. 4. In FIG. 5, it will be seen that the two embodiments of the invention exhibit a good acoustical absorbing performance in a wide frequency range including a low frequency range and a high frequency range. It will also be seen that the acoustical absorbing performance of the embodiment shown in FIG. 4 is particularly good in a mid-frequency range between 800 and 3000 Hz, although it is appreciated that the performance slightly poor in a low frequency range.

Although the invention has been shown and described by referring to the two embodiments, it is to be understood that the invention is not limited to the specific forms of the embodiments shown and described hereinbefore, and that various changes and modifications may be made therein without departing from the scope of the invention. The embodiments are shown and described merely for the purpose of illustration and should not be taken to limit the invention. For example, the porous sheets may have their surfaces beforehand melted into the same condition as those of the high density sheets and then they may be brought into intimate contact with each other. Thus obtained construction may be also included in the scope of the invention.

In the acoustical absorbing material according to the invention, porous sheets and high density sheets, at least one of which is formed with one or more through-holes, are alternately superposed one over another in intimate contact with each other. Thus by varying the order of the superposition of the porous sheets and high density sheets one over another, the thicknesses of the porous sheets and high density sheets, and the total area of the through-holes in the high density sheets, it may alter, as desired, the frequency in the low frequency range at which the absorption coefficient is maximized while enabling the absorption coefficient to be improved in the high frequency range. It will be appreciated that the acoustical absorbing material according to the invention has improved absorption coefficient with the same thickness as acoustical absorbing material of the prior art. Thus it has effective in use for shutting off noises produced by electronic equipment and other electrical household appliances.

What is claimed is:

1. An acoustical absorbing multilayered material exhibiting improved acoustical absorbing performance over a wide frequency range comprising:
    a plurality of porous sheets and a plurality of high density sheets; said plurality of high density sheets and said plurality of porous sheets being arranged alternately one in contact with another to form a multilayered material with a high density sheet being exposed and arranged on an outermost side of the material, said porous sheets and said high density sheet being held together in intimate alternate contact with one another, and
    at least the outermost exposed sheet of said plurality of high density sheets being formed therein with a plurality of through-holes.

2. An acoustical absorbing material as claimed in claim 1, wherein the total area of the through-holes formed in each of said plurality of high density sheets is less than 20% of the area of the high density sheet.

3. An acoustical absorbing material as claimed in claim 1, wherein said plurality of porous sheets are each formed of foamed plastics.

4. An acoustical absorbing material as claimed in claim 1, wherein said high density sheets are each formed of vinyl resin.

5. An acoustical absorbing material as claimed in claim 2, wherein the porous sheets are formed of foamed plastic and the high density sheets are formed of a non-foamed resin.

6. An acoustical absorbing material as claimed in claim 2, wherein each of the high density sheets is provided with through-holes.

7. An acoustical absorbing material as claimed in claim 2, wherein said multilayer material is formed of two high density sheets and two porous sheets; the outermost high density sheet being spaced from the other high density sheet by one porous sheet which is thinner than the other porous sheet.

* * * * *